US012646496B2

(12) United States Patent
Sharma et al.

(10) Patent No.: US 12,646,496 B2
(45) Date of Patent: Jun. 2, 2026

(54) METHODS AND SYSTEMS OF TEXT-CONDITIONED AUDIO-VISUAL SPEECH GENERATION WITH MULTI-MODAL LATENT DIFFUSION MODELS

(71) Applicant: TensorType Inc., Palo Alto, CA (US)

(72) Inventors: Gaurav Sharma, Newark, CA (US); Siddharth Srivastava, New Delhi (IN); Neeraj Matiyali, Haldwani (IN)

(73) Assignee: TensorType Inc., Palo Alto, CA (US)

( * ) Notice: Subject to any disclaimer, the term of this patent is extended or adjusted under 35 U.S.C. 154(b) by 136 days.

(21) Appl. No.: 18/608,583

(22) Filed: Mar. 18, 2024

(65) Prior Publication Data

US 2025/0292763 A1 Sep. 18, 2025

Related U.S. Application Data

(60) Provisional application No. 63/442,821, filed on Feb. 2, 2023.

(51) Int. Cl.
*G10L 13/02* (2013.01)
*G06T 13/40* (2011.01)
(Continued)

(52) U.S. Cl.
CPC .............. *G10L 13/02* (2013.01); *G06T 13/40* (2013.01); *G10L 13/08* (2013.01); *G10L 19/02* (2013.01);
(Continued)

(58) Field of Classification Search
None
See application file for complete search history.

(56) References Cited

U.S. PATENT DOCUMENTS

| | | | | |
|---|---|---|---|---|
| 7,117,155 B2 * | 10/2006 | Cosatto | ................... | G10L 13/00 |
| | | | | 704/E21.02 |
| 2025/0292763 A1 * | 9/2025 | Sharma | .................. | G06N 3/045 |

FOREIGN PATENT DOCUMENTS

| | | | | | |
|---|---|---|---|---|---|
| CN | 112041924 A | * | 12/2020 | ............. | G06F 18/21 |
| KR | 20220090586 A | * | 6/2022 | ............. | G10L 25/57 |
| WO | WO-2005031654 A1 | * | 4/2005 | ........... | G06V 10/764 |

OTHER PUBLICATIONS

Song, Hyoung-Kyu, et al. "Talking face generation with multilingual tts." Proceedings of the ieee/cvf conference on computer vision and pattern recognition. 2022. (Year: 2022).*

(Continued)

*Primary Examiner* — Shreyans A Patel
(74) *Attorney, Agent, or Firm* — Schwegman Lundberg & Woessner, P.A.

(57) ABSTRACT

Methods, systems, and computer programs are presented for audio-visual speech generation with multi-modal latent diffusion models. One method includes encoding raw audio signals and video frames into respective latent spaces using audio and visual autoencoders. A text transcript is processed into phoneme sequences using a text transcript processor. The audio and visual latent spaces are conditioned using the text transcript and a conditioning variable. Joint distributions of the visual and audio latent spaces, text transcript, and conditioning variable are learned using a multi-modal latent diffusion model. The model adds noise to the latent audio-visual representations and predicts the noise through denoising neural networks. An inverted diffusion process is utilized to generate diverse speech content and speaker characteristics, resulting in realistic audio-visual speech. The technology presented provides a novel approach to conditional speech generation with potential applications in speech synthesis, voice conversion, and speech recognition.

19 Claims, 7 Drawing Sheets

(51) Int. Cl.
     G10L 13/08      (2013.01)
     G10L 19/02      (2013.01)
     G10L 21/0208      (2013.01)
     G10L 25/18      (2013.01)
     G10L 25/30      (2013.01)

(52) U.S. Cl.
     CPC .......... G10L 21/0208 (2013.01); G10L 25/18
                  (2013.01); G10L 25/30 (2013.01)

(56)               References Cited

OTHER PUBLICATIONS

Shen, Shuai, et al. "Difftalk: Crafting diffusion models for generalized audio-driven portraits animation." Proceedings of the IEEE/CVF conference on computer vision and pattern recognition. 2023. (Year: 2023).*

\* cited by examiner

*200*

202 — LEARN TWO AUTOENCODERS TO ENCODE BOTH THE AUDIO AND THE VISUAL MODALITY INTO CORRESPONDING LATENT SPACES OF MUCH LOWER DIMENSIONALITY

204 — MODEL AUTOENCODERS IN THEIR CORRESPONDING LATENT SPACE - MODEL THE DISTRIBUTION USING A MULTI-MODAL LATENT PROBABILISTIC DIFFUSION MODEL

206 — USE THE AUTOENCODERS TO GENERATE AUDIO-VISUAL SPEECH

300

IMPLEMENT AUDIO AND VIDEO AUTOENCODERS ～ 302

IMPLEMENT AN AUDIO-VISUAL DIFFUSION MODEL ～ 304

IMPLEMENT A MULTI-MODAL LATENT DIFFUSION MODEL ～ 306

METHODS AND SYSTEMS OF TEXT-CONDITIONED AUDIO-VISUAL SPEECH GENERATION WITH MULTI-MODAL LATENT DIFFUSION MODELS

CROSS-REFERENCE TO RELATED APPLICATIONS

This application claims the benefit of U.S. Provisional Patent No. 63/442,821, filed Feb. 2, 2023, and entitled "Methods and Systems of Text-Conditioned Audio-Visual Speech Generation with Multi-Modal Latent Diffusion Models." This provisional application is herein incorporated by reference in its entirety.

TECHNICAL FIELD

The present subject matter described herein relates generally to an audiovisual speech synthesis. The present invention is related to a method and a system for generating text-conditioned audio-visual speech using diffusion models.

BACKGROUND

Many diverse approaches for synthesizing talking head videos have been proposed in the related research literature. Most of these approaches focus on the synthesis and animation of a human head/face where various aspects of the video, such as identity, appearance, head pose, expression, and lip movements, are driven by different sources. For instance, in audio-driven talking head generation, the facial movements, especially the mouth movements, are driven by an audio input. These approaches only focus on the synthesis of the visual modality. Therefore, applications that require multi-modal synthesis (e.g., text-based manipulation of audio-visual speech samples must rely on synthesis of audio and video in separate operations) could lead to suboptimal results. Joint synthesis of audio and video together can lead to better results, but it has not been explored much in the literature.

BRIEF DESCRIPTION OF THE DRAWINGS

Various appended drawings illustrate examples of the present disclosure and cannot be considered limiting its scope.

DETAILED DESCRIPTION

Figure 1:
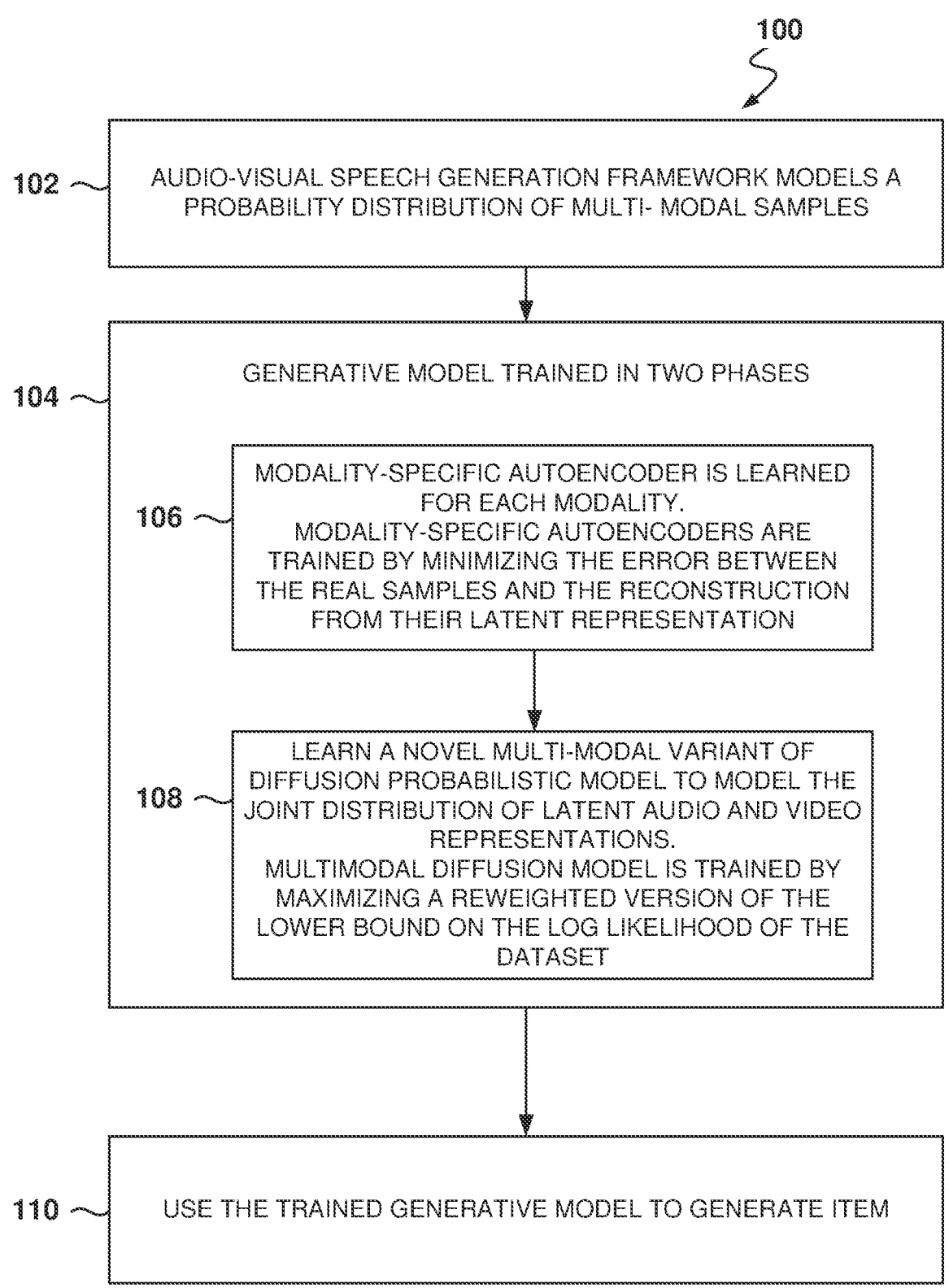
FIG. 1 illustrates an example process for conditional audio-visual speech generation with multi-modal latent diffusion models, according to some examples.

Disclosed are a system, method, and article of text-conditioned audio-visual speech generation with multi-modal latent diffusion models. The following description is presented to enable a person of ordinary skill in the art to make and use the various examples. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various examples.

Definitions

Example definitions for some examples are now provided.

A generative model is a statistical model of the joint probability distribution prob(x, y) on given observable variable x and target variable y.

A diffusion model, also known as a diffusion probabilistic model or score-based generative model, is a type of generative model that creates new data that resembles the data the model was trained on.

A latent diffusion model can be a diffusion model that, instead of applying a diffusion process directly on a high-dimensional input, projects the input into a smaller latent space to apply the diffusion(s). Further, a diffusion model can be a Markov chain(s) trained using variational inference. Diffusion models can learn the latent structure of a dataset by modeling the way in which data points diffuse through the latent space.

Machine learning (ML) can use statistical techniques to give computers the ability to learn and progressively improve performance on a specific task with data without being explicitly programmed. Deep learning is a family of machine learning methods based on learning data representations. Learning can be supervised, semi-supervised, or unsupervised. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g., random decision forests) are an ensemble learning method for classification, regression, and other tasks that operate by constructing a multitude of decision trees at training time and outputting the class that is the mode of the classes (e.g., classification) or mean prediction (e.g., regression) of the individual trees. RFs can correct for decision trees' habit of overfitting to their training set. Deep learning is a family of machine learning methods based on learning data representations. Learning can be supervised, semi-supervised, or unsupervised.

Mel scale is a perceptual scale of pitches judged by listeners to be equal in distance from one another. The reference point between this scale and normal frequency measurement is defined by assigning a perceptual pitch of 1000 mels to a 1000 Hz tone, 40 dB above the listener's threshold.

Mel spectrogram is a spectrogram where the frequencies are converted to the mel scale.

Artificial neural network (ANN) is based on a collection of connected units or nodes called artificial neurons. Each connection can transmit a signal to other neurons. An artificial neuron receives signals, then processes them, and can signal neurons connected to it. The connections are called edges. Neurons and edges can have a weight that adjusts as learning proceeds. The weight increases or decreases the strength of the signal at a connection. Neurons may have a threshold such that a signal is sent only if the aggregate signal crosses that threshold.

Example Methods and Systems

In one example, an audio-visual speech generation framework is provided. The audio-visual speech generation framework can train generative models capable of synthesizing diverse audio-visual speech samples. These can include, inter alia: video clips where the audio track captures a piece of speech, and the video track captures the speaker's face. The audio-visual speech generation framework enables the incorporation of different conditioning mechanisms that enable users to have greater control over the synthesized samples. For example, a text-conditioned version of the audio-visual speech generation model allows users to specify the contents of the speech in the synthesized samples in the form of a text input. Additional control over various aspects of synthesized samples can be gained by adding more conditioning inputs. These can include, for example, an audio-visual speech sample that serves as the reference for the identity, appearance, and speaking style of the speaker in the synthesized sample.

The proposed approach utilizes a multimodal, denoising neural network that shares information between different modalities. Unlike other approaches that generate audio and then use that audio to generate video, the proposed method performs the tasks jointly. This is achieved through the use of a joint multimodal diffusion model, which also facilitates the sharing of information during the denoising process. This approach jointly performs the denoising task, thereby enhancing the overall efficiency and effectiveness of the system.

The audio-visual speech generation framework is a flexible framework for general audio-visual speech synthesis-based problems. In contrast to existing approaches, the methods presented learn to jointly synthesize both audio and visual modalities that are consistent and synchronized with each other. With different choices of conditioning mechanisms, the techniques can be used for multiple downstream tasks. For instance, by including text transcript as a conditioning input, it can be used as an audio-visual generalization of text-to-speech (TTS) systems. It can also be used for audio-driven facial animation by adding an audio source input for driving the facial animation and a visual source for identity and appearance. The audio-visual speech generation framework can utilize latent diffusion models. The latent diffusion models can be used for the joint modeling of audio-visual speech.

The audio-visual speech generation framework can be used for a wide variety of audio-visual speech synthesis and manipulation tasks. The audio-visual speech generation framework can be used to recover corrupted segments (e.g., due to background noise, visual occlusion, etc.) in the talking head videos. Text-conditioned versions of the models can be used for creating talking head videos with dynamic content. The audio-visual speech generation framework can also be used for editing tasks such as correcting grammatical errors and correcting word choices in the videos.

FIG. 1 illustrates an example method 100 for conditional audio-visual speech generation with multi-modal latent diffusion models, according to some examples.

A diffusion model is a generative model used to model sequential data by learning the probabilistic evolution of the data over time through a series of diffusion operations. The diffusion model is used to model sequential data, such as time series or sequences of events, and is designed to capture the underlying dynamics of how the data evolves over time.

One common type of diffusion model in machine learning is the diffusion probabilistic model, where the goal is to learn a probabilistic mapping from an initial state to a final state through a sequence of intermediate operations. Each operation in the sequence represents the diffusion process, where the data is transformed in a probabilistic manner. Diffusion models can be used for images, text, audio, video, etc.

Diffusion models may be used for image generation, where the goal is to generate high-quality images from noise or low-quality inputs by iteratively refining the generated images through the diffusion process.

Forward diffusion describes the movement of a variable over time in a probabilistic manner. In the case of an image, forward diffusion starts with an actual image (e.g., a picture of a cat) and gradually adds noise to the image in small operations, eventually turning the image into pure static. This "noising" process is called forward diffusion.

During training, the diffusion model learns to reverse this noise addition process by predicting, at each operation, how much noise needs to be removed to get back to the original clean image. Once trained, the diffusion model can be used to generate entirely new data. It starts with pure noise and, operation by operation, removes noise, effectively "learning" to create realistic data similar to what it was trained on. This process is called reverse diffusion.

Method 100 can be implemented by the audio-visual speech generation framework. In operation 102, the audio-visual speech generation framework can model a probability distribution of multimodal samples (e.g., samples with multiple modalities, etc.).

In operation 104, a generative model can be trained in two phases, as described in operations 106 and 108. In the first phase, in operation 106, a modality-specific autoencoder is learned for each modality (e.g., audio and visual modality in case of audio-visual speech generation). The autoencoders learn modality-specific latent spaces that are perceptually equivalent to the original uncompressed spaces (e.g., RGB pixel space for visual modality and waveform/spectrogram space for audio) but have much lower dimensionality than them.

Given a dataset of audio-visual speech samples, the modality-specific autoencoders are trained by minimizing the error between the real samples and the reconstruction from their latent representation.

In the second phase in operation 108, method 100 learns a novel multi-modal variant of the diffusion probabilistic model to model the joint distribution of latent audio and video representations. For example, method 100 can use a multi-stream architecture for the denoising neural network that has separate parallel denoising convolutional networks for every modality.

The modality-specific networks can exchange information with each other using several cross-modal connections between them. The conditioning variables, such as the text transcript and the reference audio-visual speech, are first processed via a set of encoder neural networks and then used for conditioning the denoising neural network using techniques such as nearest neighbor resampling, concatenation and cross-attention mechanism.

The multimodal diffusion model is trained by maximizing a reweighted version of the lower bound on the log-likelihood of the dataset. This can be the equivalent to adding noise to the audio-visual latent representations and minimizing the Euclidean distance between the added noise and the one predicted by a denoising neural network from the noisy representations.

From operation 104, method 100 flows to operation 110, where the trained generative model is used to generate an item, such as a piece of text, an image, an audio, a video, etc. During the inference phase to create the item, the weights learned during the training are used to inverse the diffusion process and generate the item.

Figure 2:
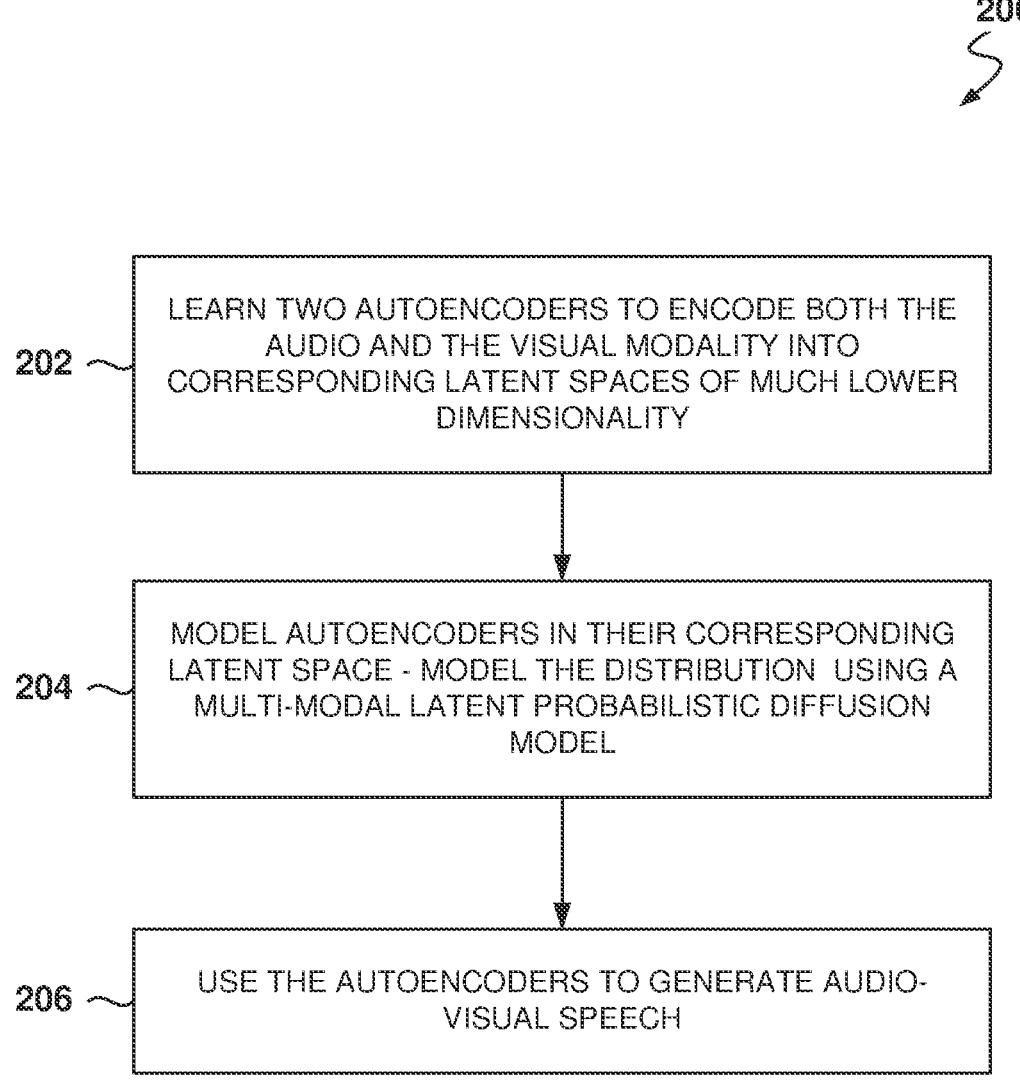
FIG. 2 illustrates an example process of text-conditioned audio-visual speech generation, according to some examples.

FIG. 2 illustrates an example method 200 of text-conditioned audio-visual speech generation, according to some examples. Method 200 can be used in generating audio-visual samples where the audio signal contains the speech following the contents of a given text transcript, and the visual signal captures the speaker's face.

Further, one goal is to model the condition distribution $\text{prob}(x_a, x_v | p, y)$ where $x_a \in \mathbb{R}^{N_a}$ and $x_v \in \mathbb{R}^{N_v \times H \times W \times 3}$ are the audio and visual modality of the speech sample that method 200 is to synthesize, p is the text transcript, and y is an additional conditioning variable that informs the speaker's voice timbre, speaking style, visual appearance, and other various characteristics in audio-visual speech that are not captured by the text transcript p. H is the height and W is the width of the image. Further, $N_a$ and $N_v$ represent the number of samples in the audio $x_a$ and the number of frames in the video $x_v$, respectively. The text transcript p is represented by a sequence of phonemes $p = \{p_1, P_2, \ldots, P_K\}$, $p_i \in P$ where P is the predefined universal set of phonemes.

The conditional distribution refers to the probability distribution of a random variable or set of random variables given certain information or conditions. In other words, it describes how the values of the random variable(s) are distributed when specific conditions are known or given. Mathematically, if X and Y are random variables, then the conditional distribution of X given Y represents the probability distribution X when the value of Y is known to be y.

In this example, given the video, the text transcript, and the additional conditioning variables that might contain information about the speaker's voice style, speaking style, or visual appearance, the description of the audio, visual speech, etc., method 200 calculates the joint probability of the audio and video.

The uncompressed audio-visual data, especially the visual signal, is extremely high-dimensional, which prohibits method 200 from directly modeling it using probabilistic models (e.g., diffusion models due to high computational demands). To deal with this high-dimensional nature of audio-visual data, method 200 follows the two-stage synthesis approach described above with reference to FIG. 1.

In the first stage, in operation 202, method 200 learns two autoencoders to encode both the audio and the visual modality into corresponding latent spaces of much lower dimensionality. Once trained, these autoencoders can encode $x_a$ and $x_v$ into the latent codes $z_a$ and $z_v$.

Each autoencoder includes an encoder and then a decoder. The encoder transforms the raw input (e.g., raw audio, raw video frames, text) into a representation that is a compressed version of the raw input. The decoder does the reverse process to reconstruct the input item (e.g., audio, text, video) that representation, which are the latent codes. Latent is used in this context to mean that the representation is "hidden."

The autoencoders can also recover the audio and the video back from the latent codes without the loss of any perceptually relevant information. In this way, through these autoencoders, method 200 obtains a two-way mapping between the raw audio-visual data and their latent representations.

Thus, in the second stage, instead of modeling audio-visual data in their original domains, in operation 204, method 200 models them in their corresponding latent spaces. For example, method 200 models the distribution $\text{prob}(x_a, x_v | p, y)$ using a multi-modal latent probabilistic diffusion model.

At operation 206, the autoencoders are used to generate the audio-visual speech.

Figure 3:
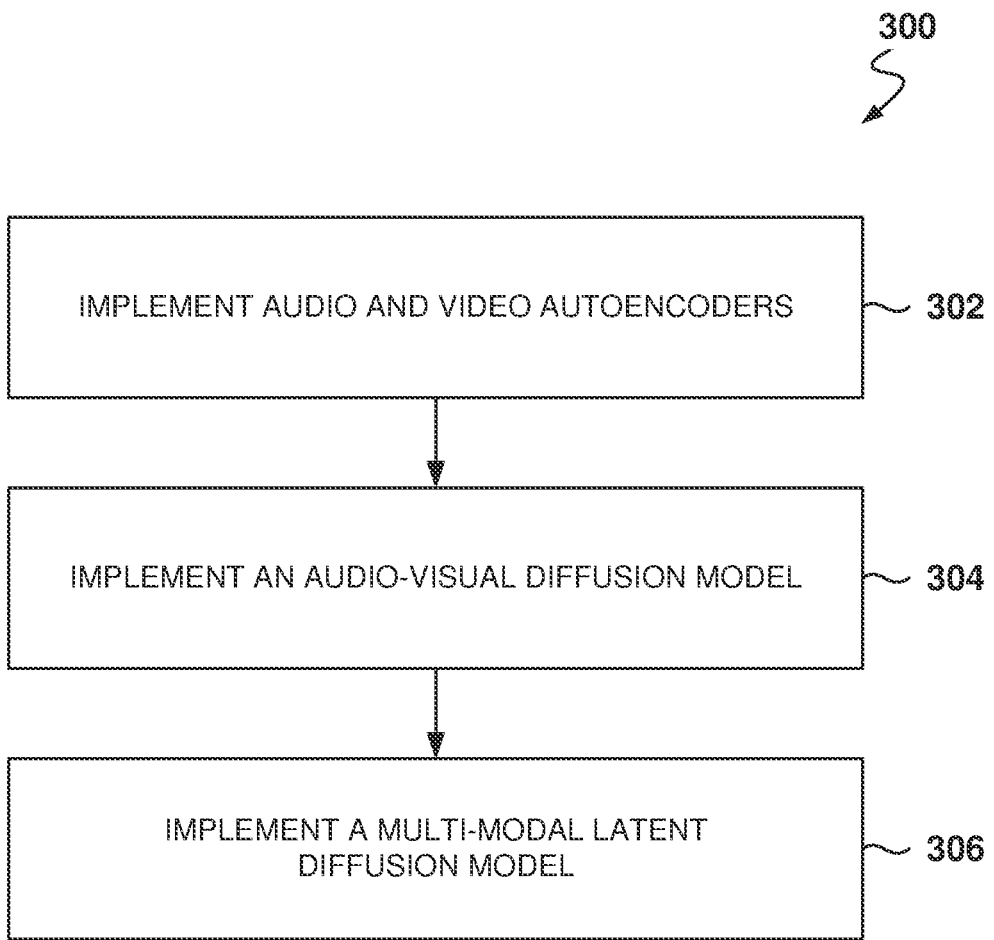
FIG. 3 illustrates an example process of text-conditioned audio-visual speech generation, according to some examples.

FIG. 3 illustrates an example method 300 of text-conditioned audio-visual speech generation, according to some examples. In operation 302, method 300 implements audio and video autoencoders. Further, $(E_a, D_a)$ and $(E_v, D_v)$ denote the audio and the video encoders and decoders, respectively.

Given an audio-video pair $(x_a, x_v)$, encoders $E_a$ and $E_v$ learn to map audio $x_a \in \mathbb{R}^{N_a}$ and video $x_v \in \mathbb{R}^{N_v \times H \times W \times 3}$ into the corresponding latent representations $z_a \in \mathbb{R}^{n_a 33\, c_a}$ and $z_v \in \mathbb{R}^{n_v \times h \times w \times c_v}$ while the decoders $D_a$ and $D_v$ learn to reconstruct $x_a$ and $x_v$ back from the latent representations $z_a$ and $z_v$. Further, $c_a$ and $c_v$ are the numbers of channels in the latent representation of audio and video modality.

In operation 304, method 300 implements an audio-visual diffusion model. Probabilistic diffusion models are latent variable models that model the data distribution $q(x_0)$ with $p\theta(x_0) = \int p_\theta(x_{0:T}) dx_{1:T}$ where $x_1, \ldots, x_T$ are the latent variables. In some examples, the joint distribution is defined as a Markov chain that starts with the normal distribution $p(x_T) = \mathcal{N}(x_T; 0, I)$ and denoises the pure noisy sample $x_T$ into $x_0$ via T Gaussian transitions, $$p_\theta(x_{0:T}) = p(x_T) \prod_{t=1}^{T} p_\theta(x_{t-1} | x_t) \tag{1}$$

$$\text{with } p_0(x_{t-1} | x_t) = \mathcal{N}\left(x_{t-1}; \mu_0(x_t, t), \sum_{\theta}(x_t, t)\right) \tag{2}$$

In diffusion models, the posterior distribution $q(x_0)$ (e.g., the diffusion or the forward process), is set to a fixed Markov chain that gradually adds noise to the data and the reverse process $p_\theta(x_{0:T})$ (Eqs. (1) and (2)) learns to invert that diffusion process.

Diffusion models are trained by maximizing a variational lower bound on $p_\theta(x_0)$. It has been shown that a reweighted version of the objective with a certain reparameterization simplifies to predicting the noise in a noisy version $x_t$ of the clean data $x_0$ using a sequence of denoising neural networks $\epsilon_\theta(x_t, t)$, as follows:

$$\mathcal{L}_{DM} = \mathbb{E}_{x_0, t, \epsilon}\left[\|\epsilon - \epsilon_\theta(x_t, t)\|_2^2\right] \qquad (3)$$

In equation (3), $\mathcal{L}^{DM}$ is the loss objective (e.g., loss function) of the diffusion model used for training, and DM refers to the Diffusion Model. Also, $\mathbb{E}$ is the expectation. Put simply, samples are being taken from some distribution, and the expectation is averaging over those samples. Further, $x_0$ is sampled from the training dataset, $\epsilon \sim \mathcal{N}(0, I)$ is the noise sampled from the normal distribution, and the time step t is uniformly sampled from $\{1, \ldots, T\}$.

In operation 306, method 300 implements one or more multi-modal latent diffusion models. An audio-video sample $(x_a, x_v)$ is obtained from the training dataset. Further, y is a conditioning variable, e.g., another audio-visual speech sample with the same speaker as $(x_a, x_v)$ for style and appearance reference.

Method 300 can first obtain the latent representations $z_a = E_a(x_a)$ and $z_v = E_v(x_v)$ using the pre-trained autoencoders. Method 300 learns the audio-visual diffusion model by adding noise to the latent audio-visual representation $z_0 = (z_a, z_v)$ as follows:

$$z_t = (z_{t,a}, z_{t,v}) = \sqrt{\overline{\alpha}_t}\, z_0 + \sqrt{1 - \overline{\alpha}_t}\,\epsilon \qquad (4)$$

Noise $\epsilon$ is predicted in the noisy latent representation $z_t$ with a neural network $\epsilon_\theta(z_t, t, p, y)$. Here, $$\overline{\alpha}_t = \prod_{s=1}^{t} 1 - \beta_s,$$

with $\beta_s$ being the variance of the s-th diffusion step in the forward process. The training objective for the diffusion model is the following:

$$\mathcal{L}_{AVDM} = \mathbb{E}_{x_0, p, y, t, \epsilon}\left[\|\epsilon - \epsilon_\theta(z_t, t, p, y)\|_2^2\right] \qquad (5)$$

Method 300 uses a two-stream architecture for $\epsilon_\theta(z_t, t, p, y)$ that has two separate parallel UNets for the audio and visual modality consisting of one-and three-dimensional convolutional layers, respectively. The two streams communicate with each other using a number of cross-modal connections. Since $z_{t,a}$ and $z_{t,v}$ may have different temporal resolutions, method 300 can either use a nearest-neighbor-based resampling or a learnable cross-attention to align the two modalities along the temporal dimension.

The text p and all the modalities in y are first encoded using separate encoders, and then the encoded representations are used for conditioning the core noise prediction UNets via cross-attention mechanisms.

In some examples, a style encoder (Se) extracts specific style characteristics from a reference audio-visual sample. These characteristics are then seamlessly incorporated into the generated audio-visual speech, adding layers of depth and authenticity to the final output.

A feature of the method presented lies in its adaptability to varied scenarios. By adjusting noise levels based on the complexity of the desired speech content, the method ensures the generation of realistic audio-visual samples in diverse situations. Attention mechanisms embedded within the denoising neural networks ($\epsilon_\theta$) focus on specific phonemes and facial expressions, enhancing the accuracy of noise prediction and, subsequently, the quality of speech generation.

The joint distribution $\text{prob}(x_a, x_v | p, y)$ is continually refined based on user feedback and preferences. This iterative process, informed by user interactions, ensures that the generated speech content captures nuanced speaker characteristics, diverse speech styles, and specific emotional expressions accurately.

Figure 4:
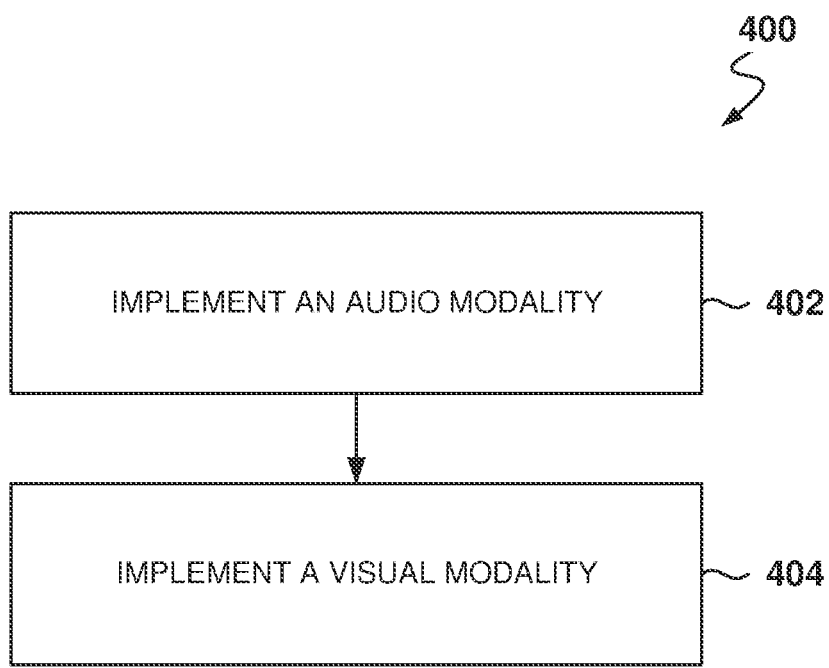
FIG. 4 illustrates an example process for implementing audio and video autoencoders, according to some examples.

FIG. 4 illustrates an example of method 400 for implementing audio and video autoencoders, according to some examples. In operation 402, method 400 implements the audio modality. In some examples, for the audio modality, method 400 trains the autoencoder in the mel-spectrogram domain instead of the raw waveform. In some examples, a 1D U-Net-like convolutional network is used for the autoencoder with no skip connections between the encoder and the decoder.

In some examples, method 400 uses a pre-trained vocoder (e.g., voice encoder) to convert the mel-spectrogram output from the decoder into an audio waveform. Between the raw waveform to the latent representation, method 400 can obtain a total compression factor of $$\frac{N_a}{n_a \cdot c_a}.$$

In operation 404, method 400 implements a visual modality. For the visual modality, method 400 trains a clip-level autoencoder. Method 400 can divide the full video $x_v$ into short clips with a length of L frames and encode each clip independently. The full latent representation $z_v$ is obtained by concatenating the latent codes of individual clips along the temporal dimension. Similar to the audio modality, in some examples, method 400 uses a U-Net like architecture for the autoencoder but with 3D convolutions. With a spatial down sampling factor of $$f_s = \frac{H}{h} = \frac{W}{w}$$

and a temporal down sampling factor of $$f_T = \frac{N_v}{n_v},$$

method 400 obtains an overall compression factor of $$\frac{3 f_s^2 f_T}{c_v}$$

in the visual modality. In some examples, method 400 trains both autoencoders with a combination of L1 reconstruction loss, perceptual losses, and adversarial losses.

Figure 5:
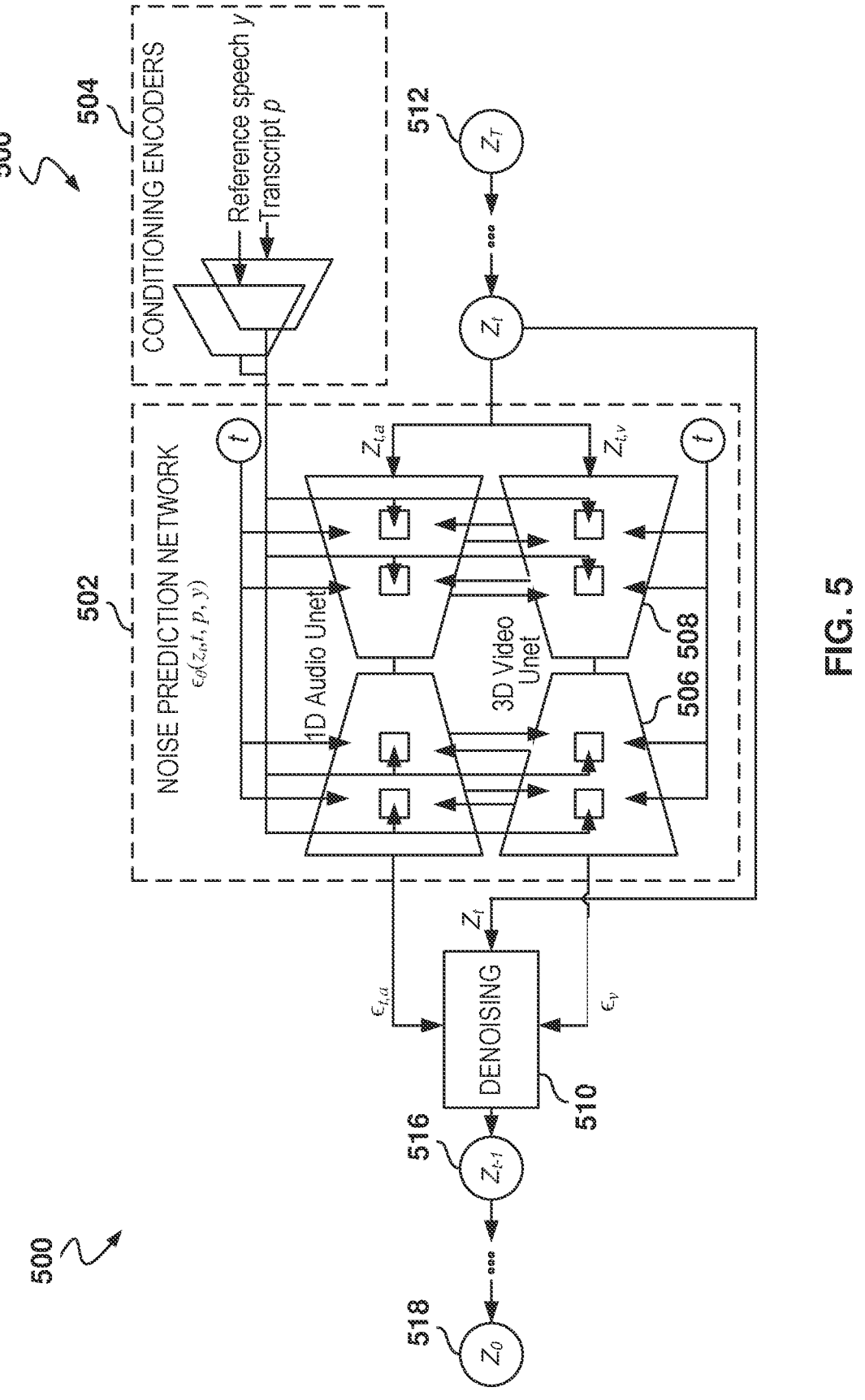
FIG. 5 illustrates an example overview of an audio-visual diffusion model, according to some examples.

FIG. 5 illustrates an example overview of an audio-visual diffusion model 500, according to some examples. The noise prediction network 502 is for processing two modalities simultaneously, and that is why there are two streams. FIG. 5 illustrates the reverse of the diffusion process, which starts with $z_T$ 512 (noise image) and ends with $z_0$ 518, which is the clean image. That is, the goal is to eliminate the noise from an image. The diffusion process started with $z_0$ 518 and ended with $z_T$ 512, so that is why the image shows the reverse process going from right to left.

At the time of inference, the input is pure noise $z_T$ 512, and the noise prediction network 502 is used to predict the noise. The denoising neural network 510 then eliminates the noise. The process is repeated multiple times (e.g., three to 20 times) to gradually remove the noise from the pure noise, resulting in the clean generative sample $z_0$ 518 generated from the noise sample $z_T$ 512. In this example, there are two channels $z_{t,a}$ and $z_{t,v}$, one for speech and the other one for video.

The conditioning encoders 504 include as input the reference speech y and the transcript p, and the output of the conditioning encoders 504 is used as inputs to the noise prediction network 502. The information extracted by the conditioning encoders is used to control the generated audio visual speech sample. For example, the speech content of the generated sample is described by the transcript p and the speaker's characteristics (e.g., speaker's voice, appearance) can be derived from the reference speech.

Each stream includes a neural network 508 and a neural network 506. The neural network 508 down samples the input (e.g., $z_{t,v}$), and the neural network 506 up-samples the output of the neural network 508, to obtain $\epsilon_{t,a}$ and $\epsilon_{t,v}$ for the two channels.

The denoising operation 510 takes as inputs $z_t$, $\epsilon_{t,a}$, and $\epsilon_{t,v}$, and outputs $z_{t-1}$ 516, $z_{t-2}$, ... $z_0$ 518 as the different iterations of the denoising are performed to remove the predicted noise from the noisy version $z_t$. The denoising neural network includes the noise prediction network and the denoising operation.

The neural networks 506 and 508 of the two streams exchange information during the process, represented by vertical arrows interconnecting the neural networks. The goal is to share information between these two modalities while predicting the noise in these two modalities. With the help of this cross-model communication, information is shared between the neural networks. For example, an attention feature used as an intermediate representation from one of the neural networks is used as a feature in the other neural network.

Figure 6:
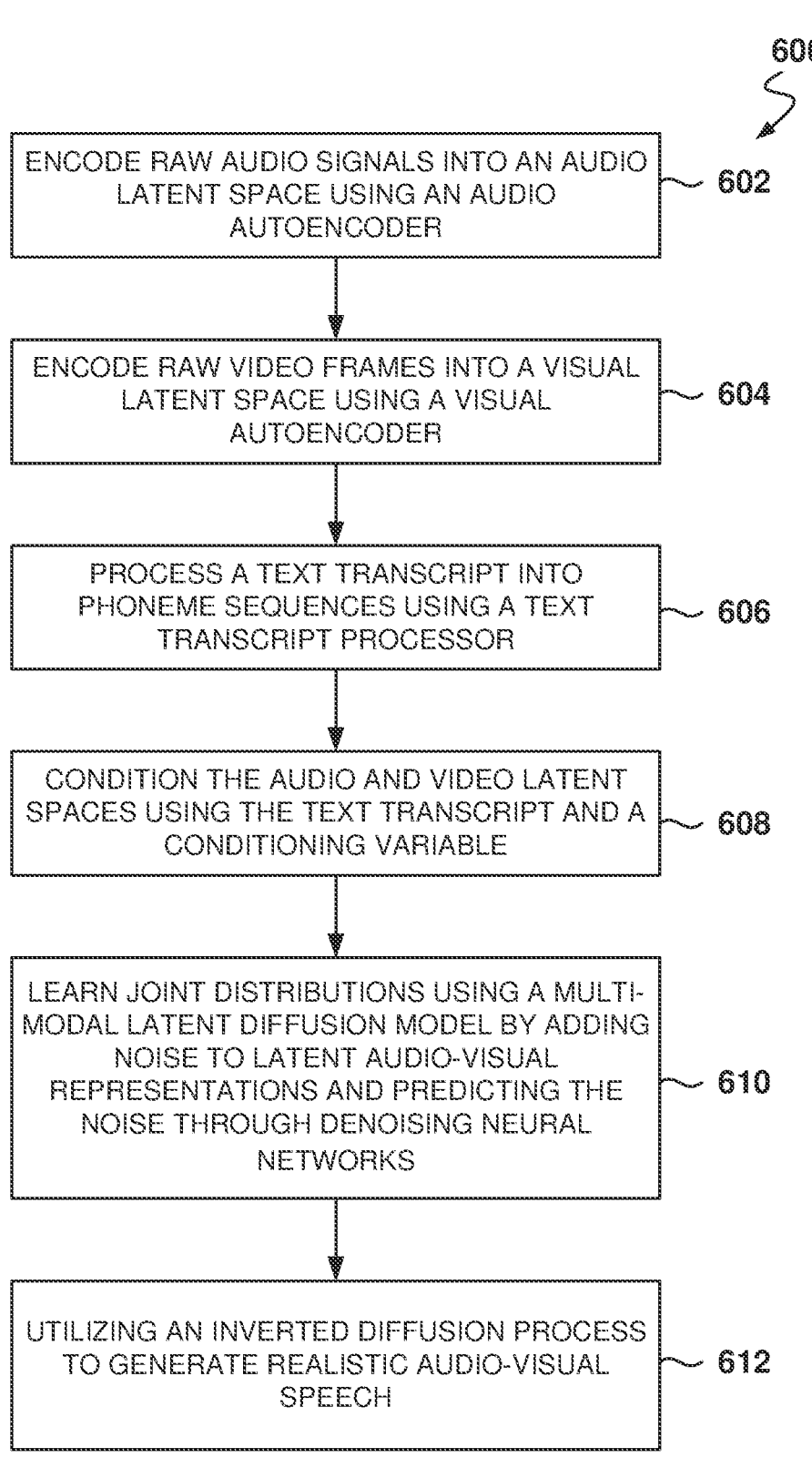
FIG. 6 is a flowchart of a method for audio-visual speech generation with multi-modal latent diffusion models, according to some examples.

FIG. 6 is a flowchart of a method 600 for audio-visual speech generation with multi-modal latent diffusion models, according to some examples. While the various operations in this flowchart are presented and described sequentially, one of ordinary skill will appreciate that some or all of the operations may be executed in a different order, be combined or omitted, or be executed in parallel.

Operation 602 is for encoding raw audio signals ($x_a$) into an audio latent space ($z_a$) using an audio autoencoder ($E_a$, $D_a$).

From operation 602, method 600 flows to operation 604 for encoding raw video frames ($x_v$) into a visual latent space ($z_v$) using a visual autoencoder ($E_v$, $D_v$).

From operation 604, method 600 flows to operation 606 for processing a text transcript ($p=\{p_1, p_2, \ldots, p_K\}$, $p_i \in P$) into phoneme sequences using a text transcript processor.

From operation 606, method 600 flows to operation 608 for conditioning the audio latent space ($z_a$) and the visual latent space ($z_v$) using the text transcript (p) and a conditioning variable (y).

From operation 608, the method 600 flows to operation 610 for learning joint distributions of the visual latent space, the audio latent space, the text transcript, and the conditioning variable ($prob(z_a, z_v|p, y)$) using a multi-modal latent diffusion model by adding noise ($\epsilon$) to the latent audiovisual representations ($z_0=(z_a, z_v)$) of the audio latent space and the visual latent space, and predicting said noise ($\epsilon$) through denoising neural networks ($\epsilon_\theta(z_t,t, p, y)$).

From operation 610, method 600 flows to operation 612 for utilizing an inverted diffusion process ($p_\theta(x_0:T)$) to generate realistic audio-visual samples capturing diverse speech content and speaker characteristics.

In one example, the additional conditioning variable (y) includes parameters specifying emotional expression in the generated realistic audio-visual speech.

In one example, the conditioning variable (y) includes parameters related to the gender of the speaker, allowing the generated realistic audio-visual speech to exhibit gender-specific characteristics.

In one example, the autoencoder ($E_a$, $D_a$) employs convolutional neural networks (CNNs) to transform raw audio signals into mel-spectrogram representations before encoding into the latent space.

In one example, the visual autoencoder ($\epsilon_v$, $D_a$) utilizes 3D convolutional networks to encode the raw video frames into the visual latent space In one example, a style encoder (Se) encodes a reference audio-visual sample to extract specific style characteristics to be applied to the generated audio-visual speech.

In one example, the denoising neural networks ($\epsilon_\theta$) utilize cross-modal connections to align audio and visual modalities.

In one example, the inverted diffusion process ($p_\theta(x_0:T)$) includes generating diverse speech content by manipulating the audio latent space and the visual latent space representations ($z_a$, $z_v$) based on different text transcripts (p) and additional conditioning variables (y).

In one example, method 600 further comprises converting the generated audio signals into waveforms and converting the video frames into a video format for seamless integration into audio-visual content.

In one example, the inverted diffusion process includes adjusting noise levels based on the complexity of the desired speech content, ensuring realistic generation in varied scenarios.

In one example, the denoising neural networks ($\epsilon_\theta$) employ attention mechanisms to focus on specific phonemes and facial expressions, enhancing the accuracy of noise prediction and speech generation.

In one example, the joint distributions ($prob(z_a, z_v|p, y)$) are learned iteratively, refining the generation process based on user feedback and preferences for specific speaker characteristics and speech styles.

The foregoing summary is illustrative only and is not intended to be in any way limiting. In addition to the illustrative aspects, examples, and features described above, further aspects, examples, and features will become apparent by reference to the drawings and the following detailed description.

Another general aspect is for a system that includes a memory comprising instructions and one or more computer processors. The instructions, when executed by the one or more computer processors, cause the one or more computer processors to perform operations comprising: encoding raw audio signals into an audio latent space using an audio autoencoder; encoding raw video frames into a visual latent space using a visual autoencoder; processing a text transcript into phoneme sequences using a text transcript processor; conditioning the audio latent space and the visual latent space using the text transcript and a conditioning variable; learning joint distributions of the visual latent space, the audio latent space, the text transcript, and the conditioning variable using a multi-modal latent diffusion model by adding noise to latent audio-visual representations of the audio latent space and the visual latent space and predicting said noise through denoising neural networks; and utilizing an inverted diffusion process to generate realistic audio-visual speech capturing diverse speech content and speaker characteristics.

In yet another general aspect, a tangible machine-readable storage medium (e.g., a non-transitory storage medium) includes instructions that, when executed by a machine, cause the machine to perform operations comprising: encoding raw audio signals into an audio latent space using an audio autoencoder; encoding raw video frames into a visual latent space using a visual autoencoder; processing a text transcript into phoneme sequences using a text transcript processor; conditioning the audio latent space and the visual latent space using the text transcript and a conditioning variable; learning joint distributions of the visual latent space, the audio latent space, the text transcript, and the conditioning variable using a multi-modal latent diffusion model by adding noise to latent audio-visual representations of the audio latent space and the visual latent space and predicting said noise through denoising neural networks; and utilizing an inverted diffusion process to generate realistic audio-visual speech capturing diverse speech content and speaker characteristics.

Figure 7:
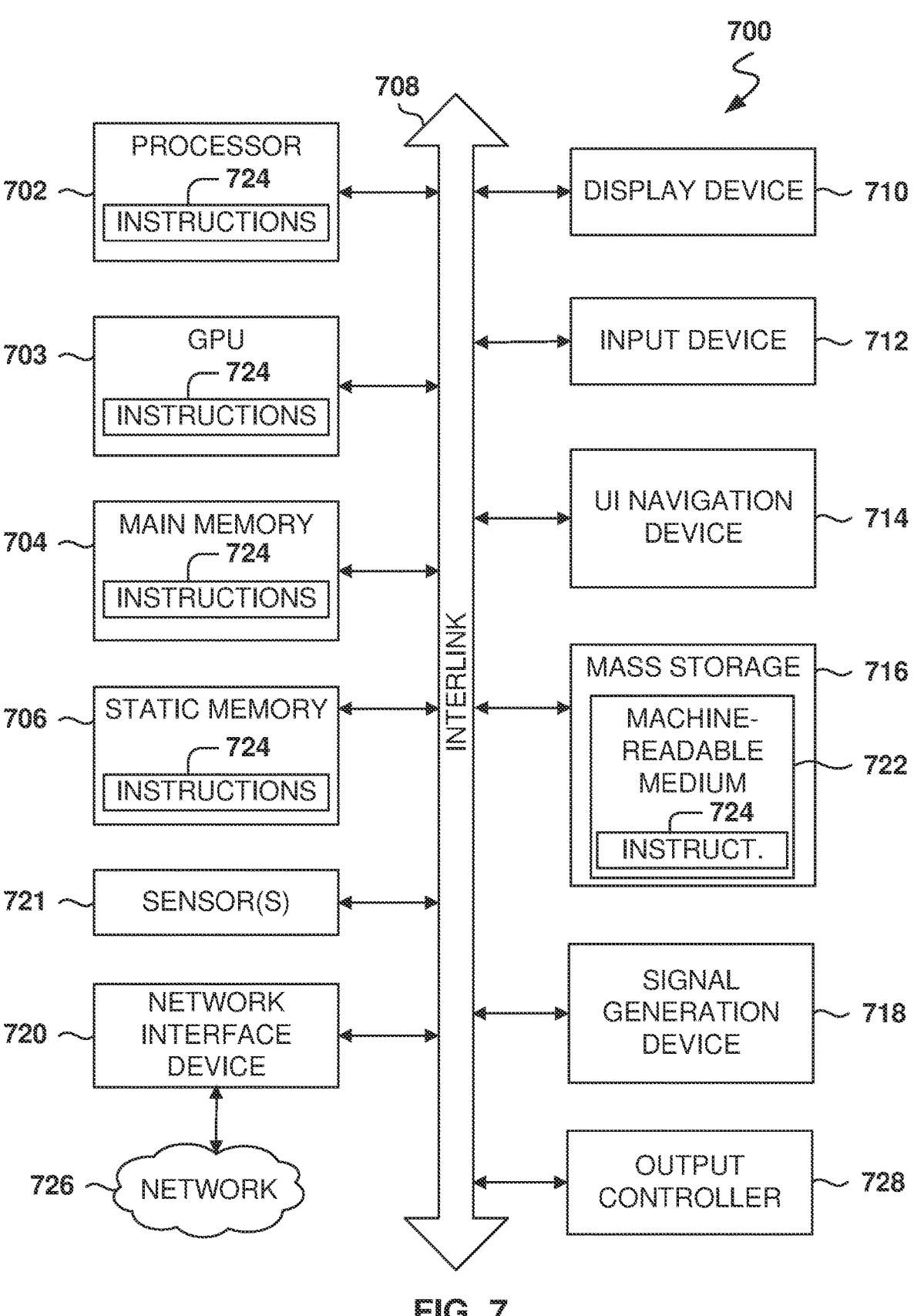
FIG. 7 is a block diagram illustrating an example of a machine upon or by which one or more example process examples described herein may be implemented or controlled.

FIG. 7 is a block diagram illustrating an example of a machine 700 upon or by which one or more example process examples described herein may be implemented or controlled. In alternative examples, the machine 700 may operate as a standalone device or be connected (e.g., networked) to other machines. In a networked deployment, the machine 700 may operate in the capacity of a server machine, a client machine, or both in server-client network environments. In an example, the machine 700 may act as a peer machine in a peer-to-peer (P2P) (or other distributed) network environment. Further, while only a single machine 700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 700 (e.g., computer system) may include a hardware processor 702 (e.g., a central processing unit (CPU), a hardware processor core, or any combination thereof), a graphics processing unit (GPU 703), a main memory 704, and a static memory 706, some or all of which may communicate with each other via an interlink 708 (e.g., bus). The machine 700 may further include a display device 710, an alphanumeric input device 712 (e.g., a keyboard), and a user interface (UI) navigation device 714 (e.g., a mouse). In an example, the display device 710, alphanumeric input device 712, and UI navigation device 714 may be a touch screen display. The machine 700 may additionally include a mass storage device 716 (e.g., drive unit), a signal generation device 718 (e.g., a speaker), a network interface device 720, and one or more sensors 721, such as a Global Positioning System (GPS) sensor, compass, accelerometer, or another sensor. The machine 700 may include an output controller 728, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 702 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 702 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 702 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 702 may be emulated in software, running on a physical processor, as a virtual processor, or as a virtual circuit. The virtual processor may behave like an independent processor but is implemented in software rather than hardware.

13

The mass storage device 716 may include a machine-readable medium 722 on which one or more sets of data structures or instructions 724 (e.g., software) embodying or utilized by any of the techniques or functions described herein. The instructions 724 may also reside, completely or at least partially, within the main memory 704, within the static memory 706, within the hardware processor 702, or the GPU 703 during execution thereof by the machine 700. For example, one or any combination of the hardware processor 702, the GPU 703, the main memory 704, the static memory 706, or the mass storage device 716 may constitute machine-readable media.

While the machine-readable medium 722 is illustrated as a single medium, the term "machine-readable medium" may include a single medium or multiple media (e.g., a centralized or distributed database and associated caches and servers) configured to store one or more instructions 724.

The term "machine-readable medium" may include any medium that is capable of storing, encoding, or carrying instructions 724 for execution by the machine 700 and that causes the machine 700 to perform any one or more of the techniques of the present disclosure, or that is capable of storing, encoding, or carrying data structures used by or associated with such instructions 724. Non-limiting machine-readable medium examples may include solid-state memories and optical and magnetic media. For example, a massed machine-readable medium comprises a machine-readable medium 722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be transmitted or received over a communications network 726 using a transmission medium via the network interface device 720.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method, for conditional audio-visual speech generation, comprising:

encoding raw audio signals into an audio latent space using an audio autoencoder;

encoding raw video frames into a visual latent space using a visual autoencoder;

processing text transcripts associated with the raw audio signals into phoneme sequences using a text transcript processor;

conditioning the audio latent space and the visual latent space using the text transcripts and a conditioning variable;

learning a generative model based on joint distributions of the visual latent space, the audio latent space, the text transcripts, and the conditioning variable using a multimodal latent diffusion model by adding noise to latent audio-visual representations of the audio latent space and the visual latent space and predicting said noise through denoising neural networks;

receiving a text input and a reference video speech of a speaker; and generating, by the generative model, an audio-visual output based on the text input and the reference video speech of the speaker, wherein an audio signal of the audio-visual output contains speech based on the text input and a video signal of the audio-visual output includes a video of the speaker coordinated with the audio signal.

2. The computer-implemented method as claimed in claim 1, wherein the conditioning variable includes parameters specifying emotional expression in the raw audio signals and raw video frames.

3. The computer-implemented method as claimed in claim 2, wherein the conditioning variable includes parameters related to gender of the speaker, allowing the generated audio-visual output to exhibit gender-specific characteristics.

4. The computer-implemented method as claimed in claim 1, wherein the audio autoencoder employs convolutional neural networks (CNNs) to transform the raw audio signals into mel-spectrogram representations before encoding into the audio latent space.

5. The computer-implemented method as claimed in claim 1, wherein the visual autoencoder utilizes 3D convolutional networks to encode the raw video frames into the visual latent space.

6. The computer-implemented method as claimed in claim 1, wherein a style encoder encodes a reference audio-visual sample to extract specific style characteristics to be applied to the generated audio-visual output.

7. The computer-implemented method as claimed in claim 1, wherein the denoising neural networks utilize cross-modal connections to align audio and visual modalities.

8. The computer-implemented method as claimed in claim 1, wherein the inverted diffusion process includes generating diverse speech content by manipulating the audio latent space and the visual latent space representations based on the text transcripts and additional conditioning variables.

9. The computer-implemented method as claimed in claim 1, wherein the inverted diffusion process includes adjusting noise levels based on a complexity of desired speech content, ensuring realistic generation in varied scenarios.

10. The computer-implemented method as claimed in claim 1, wherein the denoising neural networks employ attention mechanisms to focus on specific phonemes and facial expressions, enhancing an accuracy of noise prediction and speech generation.

11. The computer-implemented method as claimed in claim 1, wherein the joint distributions are learned iteratively, refining the generation process based on user feedback and preferences for specific speaker characteristics and speech styles.

12. A system comprising:
a memory comprising instructions; and
one or more computer processors, wherein the instructions, when executed by the one or more computer processors, cause the system to perform operations comprising:
encoding raw audio signals into an audio latent space using an audio autoencoder;
encoding raw video frames into a visual latent space using a visual autoencoder;
processing text transcripts associated with the raw audio signals into phoneme sequences using a text transcript processor;
conditioning the audio latent space and the visual latent space using the text transcripts and a conditioning variable;
learning a generative model based on joint distributions of the visual latent space, the audio latent space, the text transcripts transcript, and the conditioning variable using a multi-modal latent diffusion model by adding noise to latent audio-visual representations of the audio latent space and the visual latent space and predicting said noise through denoising neural networks;
receiving a text input and a reference video speech of a speaker; and
generating, by the generative model, an audio-visual output based on the text input and the reference video speech of the speaker, wherein an audio signal of the audio-visual output contains speech based on the text input and a video signal of the audio-visual output includes a video of the speaker coordinated with the audio signal.

13. The system as recited in claim 12, wherein the conditioning variable includes parameters specifying emotional expression in the raw audio signals and raw video frames.

14. The system as recited in claim 13, wherein the conditioning variable includes parameters related to gender of the speaker, allowing the generated audio-visual output to exhibit gender-specific characteristics.

15. The system as recited in claim 12, wherein the audio autoencoder employs convolutional neural networks (CNNs) to transform the raw audio signals into mel-spectrogram representations before encoding into the audio latent space.

16. The system as recited in claim 12, wherein the visual autoencoder utilizes 3D convolutional networks to encode the raw video frames into the visual latent space.

17. A non-transitory machine-readable storage medium including instructions that, when executed by a machine, cause the machine to perform operations comprising:
encoding raw audio signals into an audio latent space using an audio autoencoder;
encoding raw video frames into a visual latent space using a visual autoencoder;
processing text transcripts associated with the raw audio signals into phoneme sequences using a text transcript processor;
conditioning the audio latent space and the visual latent space using the text transcripts and a conditioning variable;
learning a generative model based on joint distributions of the visual latent space, the audio latent space, the text transcripts, and the conditioning variable using a multi-modal latent diffusion model by adding noise to latent audio-visual representations of the audio latent space and the visual latent space and predicting said noise through denoising neural networks;
receiving a text input and a reference video speech of a speaker; and
generating, by the generative model, an audio-visual output based on the text input and the reference video speech of the speaker, wherein an audio signal of the audio-visual output contains speech based on the text input and a video signal of the audio-visual output includes a video of the speaker coordinated with the audio signal.

18. The non-transitory machine-readable storage medium as recited in claim 17, wherein the conditioning variable includes parameters specifying emotional expression in the raw audio signals and raw video frames.

19. The non-transitory machine-readable storage medium as recited in claim 18, wherein the conditioning variable includes parameters related to gender of the speaker, allowing the generated audio-visual output to exhibit gender-specific characteristics.

* * * * *